United States Patent [19]

Merritt

[11] 4,208,638
[45] Jun. 17, 1980

[54] HF OR DF CHEMICAL LASER USING LASER INDUCED CHEMISTRY

[75] Inventor: James A. Merritt, Pulaski, Tenn.

[73] Assignee: The United States of America as represented by the Secretary of the Army, Washington, D.C.

[21] Appl. No.: 927,327

[22] Filed: Jul. 24, 1978

[51] Int. Cl.$^2$ .......................................... H01S 3/223
[52] U.S. Cl. ............................................. 331/94.5 G
[58] Field of Search .................... 331/94.5 D, 94.5 G, 331/94.5 P; 330/4.3

[56] References Cited

U.S. PATENT DOCUMENTS 4,063,896 12/1977 Merritt et al. ..................... 23/254 R Primary Examiner—William L. Sikes
Attorney, Agent, or Firm—Nathan Edelberg; Robert P. Gibson; Jack W. Voigt

[57] ABSTRACT

A chemical HF or DF laser is obtained by irradiating $COF_2+H_2/D_2$ in admixture with the $R_{12}$ line of a $CO_2$ laser. The irradiation is accomplished in a laser cavity provided with appropriate Brewster windows, mirrors, and coupling means. The $COF_2$ is mixed with $H_2$ or $D_2$ in a properly conditioned system without reacting. The irradiating by the $R_{12}$ line of a $CO_2$ laser dissociates the $COF_2$ to form $CO+2F^*$ ($F^*$—atom in an excited state). The $F^*$ atom then reacts with $H_2/D_2$ present to produce HF or DF in an excited vibrational state. The halogen containing molecule then lases.

3 Claims, 1 Drawing Figure

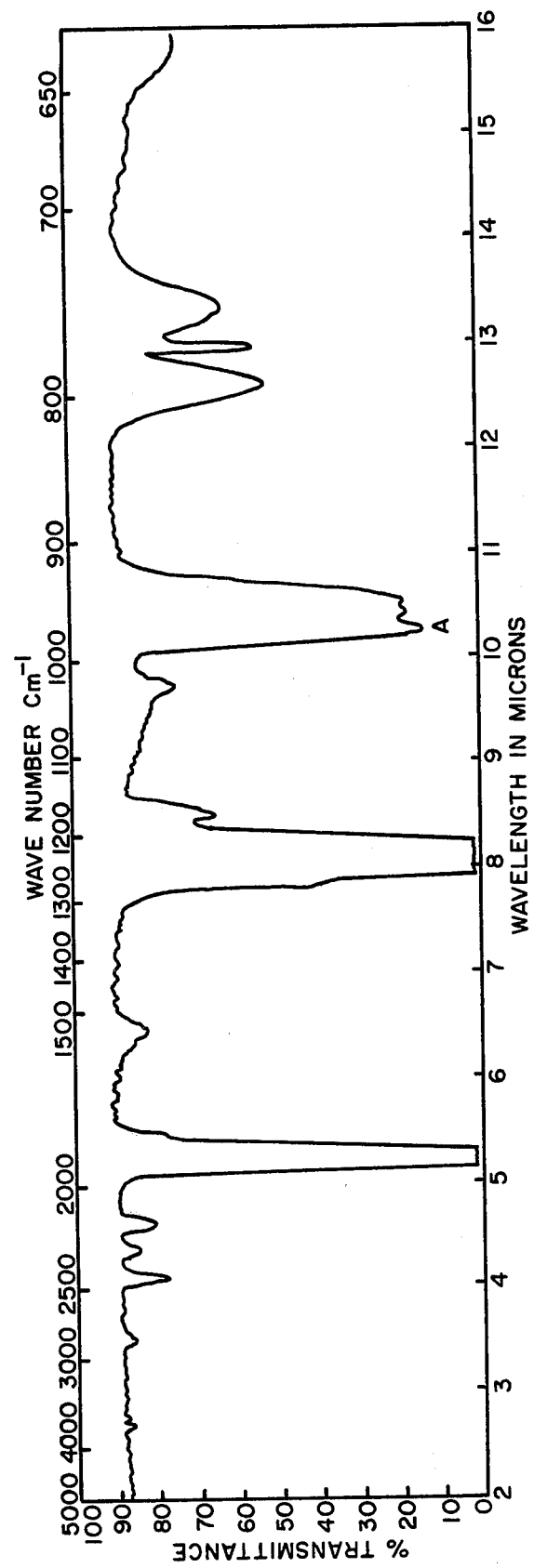

HF OR DF CHEMICAL LASER USING LASER INDUCED CHEMISTRY

DEDICATORY CLAUSE

The invention described herein may be manufactured, used, and licensed by or for the Government for governmental purposes without the payment to me of any royalties thereon.

BACKGROUND OF THE INVENTION

Hydrogen fluoride (HF) and deuterium fluoride (DF) lasers have been demonstrated by various techniques. Perhaps the most widely used method of perfecting the conditions for HF or DF lasing employs a pre-combustor for forming excited fluorine atoms which are admitted into a laser cavity along with an excess of hydrogen or deuterium at a predetermined pressure and concentration to cause HF or DF to be formed in an excited vibrational state which subsequently lases. The high temperature causes a highly corrosive state to exist in the pre-combustor, the laser cavity, and the mechanical pumping or chemical pumping system.

Considerable efforts have been expended in experiments wherein premixing of fluorine and hydrogen gases is accomplished at room temperature; however, even at room temperature, fluorine gas and hydrogen gas are reactive, although the reaction is slow, sufficient HF is formed to deactivate any lasing action. The advantages of lasing at room temperature after meeting the requirements of obtaining homogeneity of the premixed reactant gases for HF or DF lasing have not been fully achieved because of the deactivation species present in the laser cavity. Thus, a chemical laser system which is troubled with deactivation species does not have the performance requirements needed for an efficient, operable system.

Therefore, an object of this invention is to provide an admixture which can be premixed at room temperature after proper conditioning of the system which is not reactive until the admixture is irradiated with a $CO_2$ laser thereby causing a dissociation reaction.

A further object of this invention is to provide a chemical HF or DF laser that is obtained by irradiating a mixture of $COF_2 + H_2/D_2$ in a laser cavity which effects the dissociation of $COF_2$ to produce F-atoms in an excited state which subsequently reacts with the $H_2/D_2$ present to produce HF or DF in an excited vibrational state which lases.

SUMMARY OF THE INVENTION

A cw $CO_2$ multiline laser operating at a power level of about 150 watts is employed as a source of radiation to irradiate a room temperature mixture of $COF_2$ and $H_2/D_2$ in a predetermined pressure range from about 25 to about 200 torr.

The specified gases in admixture are metered into a properly conditioned laser cell (e.g., a 10 cm by 3 cm stainless steel cell, prior cleaned, evacuated, and fitted with HF type, i.e., proper Brewster windows, mirrors, and coupling arrangement) to achieve a predetermined pressure and subsequently exposed to cw $CO_2$ multiline laser radiation for a predetermined time to effect dissociation of $COF_2$. The $COF_2$ is dissociated by resonant laser radiation. The fundamental vibration of $COF_2$ ($v_1$ 965 cm$^{-1}$) is resonant with the $CO_2$ $R_{12}$ (970 cm$^{-1}$) laser frequency. $COF_2$ is dissociated by the specified laser frequency to yield nascent fluorine in an excited energy state. This fluorine immediately reacts with the $H_2/D_2$, i.e., $F^* + H_2/D_2 \rightarrow HF^*/DF^*$ and H/D, to form excited HF* or DF*.

BRIEF DESCRIPTION OF THE DRAWING

The FIGURE of the drawing is an infrared spectra of $COF_2$ wherein the percent transmittance is shown on the ordinate and the wave number (cm$^{-1}$) and wavelength in microns are shown on the abscissa.

DESCRIPTION OF THE PREFERRED EMBODIMENTS

An admixture of $COF_2$ and $H_2/D_2$ at a predetermined pressure from about 25 torr to about 200 torr is irradiated in a laser cell to effect dissociation of $COF_2$. The dissociation product, nascent fluorine in an excited state, immediately reacts with $H_2/D_2$ to form HF/DF and H/D. The HF or DF in the excited vibrational state lases.

The predetermined power level of the cw $CO_2$ multiline laser of about 150 watts and an irradiating time period of about one second effects dissociation of $COF_2$. The fundamental vibration of $COF_2$ ($v_1$ 965 cm$^{-1}$) is resonant with the $CO_2$ $R_{12}$ (970 cm$^{-1}$) laser frequency. The fundamental is designated as "A" on the figure of the drawing which depicts $COF_2$ (25 torr) infrared spectra.

The laser dissociation of $COF_2$ to generate nascent fluorine atoms in the presence of hydrogen or deuterium is an effective method to produce HF or DF lasing. Particularly attractive is the fact that $COF_2$ and $H_2/D_2$ can be premixed to provide an available source for the nascent fluorine once the $COF_2$ admixture is irradiated to produce it, and the other reactant, $H_2$ or $D_2$, with which the nascent fluorine reacts immediately to form HF or DF which lases.

This invention method is adaptable for use with higher laser power irradiation for smaller or larger systems. Also, the laser cavity wherein the dissociation and laser action takes place should be adaptable for chemical or mechanical pumping. A cartridge or canister admixture of the $COF_2$ and $H_2/D_2$ for charging the laser cavity and a chemical pumping means for maintaining the proper conditions in the laser cavity should provide mobile HF or DF lasing capability for the user.

I claim:

1. A method for the production of nascent fluorine by irradiating $COF_2$ in admixture with $H_2/D_2$ to produce HF or DF in an excited vibrational state which lases, said method comprising:
   (i) preparing a homogeneous admixture of $COF_2$ and $H_2/D_2$;
   (ii) metering said admixture of $COF_2$ and $H_2/D_2$ into a properly conditioned laser cell to achieve a predetermined pressure from about 25 to about 200 torr; and
   (iii) irradiating said admixture of $COF_2$ and $H_2/D_2$ for a predetermined time period with the $R_{12}$ line of a cw $CO_2$ multiline laser operating at a predetermined power level to effect dissociation of $COF_2$ to produce nascent fluorine atoms which immediately react with $H_2/D_2$ present to produce HF or DF in an excited vibrational state which lases.

2. The method of claim 1 wherein said homogeneous admixture is $COF_2$ and $H_2$; said predetermined pressure of said homogeneous admixture in said laser cell is about 25 torr; said predetermined power level of said cw $CO_2$ multiline laser is about 150 watts; said predetermined time of irradiating is about one second; and wherein HF is produced in an excited vibrational state which lases.

3. The method of claim 1 wherein said homogeneous admixture is $COF_2$ and $D_2$; said predetermined pressure of said homogeneous admixture in said laser cell is about 25 torr; said predetermined power level of said cw $CO_2$ multiline laser is about 150 watts; said predetermined time of irradiating is about one second; and wherein DF is produced in an excited vibrational state which lases.

* * * * *